United States Patent
Yoon et al.

(10) Patent No.: US 8,017,014 B2
(45) Date of Patent: *Sep. 13, 2011

(54) METHOD FOR IMPROVING FLUX IN A MEMBRANE BIOREACTOR

(75) Inventors: Seong-Hoon Yoon, Naperville, IL (US); John H. Collins, Bloomingdale, IL (US); Jeroen A. Koppes, Leiden (NL); Ingmar H. Huisman, Delft (NL)

(73) Assignee: Nalco Company, Naperville, IL (US)

( * ) Notice: Subject to any disclaimer, the term of this patent is extended or adjusted under 35 U.S.C. 154(b) by 793 days.

This patent is subject to a terminal disclaimer.

(21) Appl. No.: 11/142,745

(22) Filed: Jun. 1, 2005

(65) Prior Publication Data
US 2006/0272198 A1    Dec. 7, 2006

(51) Int. Cl.
*C02F 3/00* (2006.01)

(52) U.S. Cl. ........ 210/605; 210/615; 210/620; 210/630; 210/631; 210/636

(58) Field of Classification Search .......... 210/605, 210/615, 620, 630–634, 638, 639, 732–735, 210/616–618, 151, 196, 198.1, 259, 150, 210/209, 636
See application file for complete search history.

(56) References Cited

U.S. PATENT DOCUMENTS

| | | | |
|---|---|---|---|
| 3,142,638 A * | 7/1964 | Blaisdell et al. | 210/695 |
| 3,472,765 A | 10/1969 | Budd et al. | |
| 4,749,494 A | 6/1988 | Tomoyasu et al. | |
| 5,254,253 A | 10/1993 | Behmann | |
| 5,266,203 A | 11/1993 | Mukhopadhyay et al. | |
| 5,302,288 A * | 4/1994 | Meidl et al. | 210/616 |
| 5,494,577 A | 2/1996 | Rekers | |
| 5,558,774 A | 9/1996 | Tonelli et al. | |
| 5,914,040 A | 6/1999 | Pescher et al. | |
| 5,932,099 A | 8/1999 | Cote et al. | |
| 6,027,649 A * | 2/2000 | Benedek et al. | 210/639 |
| 6,207,649 B1 | 3/2001 | Weis et al. | |
| 6,313,246 B1 | 11/2001 | Carter et al. | |
| 6,416,668 B1 | 7/2002 | Al-Samadi | |
| 6,428,705 B1 * | 8/2002 | Allen et al. | 210/638 |
| 6,517,723 B1 * | 2/2003 | Daigger et al. | 210/605 |
| 6,692,642 B2 * | 2/2004 | Josse et al. | 210/605 |
| 6,723,245 B1 | 4/2004 | Collins et al. | |

(Continued)

FOREIGN PATENT DOCUMENTS

DE    4022651    1/1992
(Continued)

OTHER PUBLICATIONS

Publication: "Membrane Bioreactors (MBR) for Municipal Wastewater Treatment—An Australian Perspective", Stephen Chapman et al; downloaded from the Internet Dec. 5, 2007 and incorporated into the file of U.S. Appl. No. 10/787,989; apparently undated.*

(Continued)

*Primary Examiner* — Joseph W Drodge
(74) *Attorney, Agent, or Firm* — Joshua D. Bishop; Michael B. Martin

(57) ABSTRACT

The invention pertains to a method(s) of improving flux in a membrane bioreactor by adding an effective amount of catonic, amphoteric, and zwitterionic polymers, or a combination thereof. The membrane bioreactor impacted by the addition of these polymers is made up of a combination of anaerobic reactors, anoxic reactors, and aerobic reactors and anaerobic digesters.

23 Claims, 4 Drawing Sheets

U.S. PATENT DOCUMENTS

| | | | | |
|---|---|---|---|---|
| 6,863,817 | B2 * | 3/2005 | Liu et al. .................. | 210/605 |
| 6,926,832 | B2 * | 8/2005 | Collins et al. ............. | 210/615 |
| 7,087,170 | B2 * | 8/2006 | You et al. .................. | 210/605 |
| 7,288,197 | B2 * | 10/2007 | Shao et al. ................. | 210/615 |
| 2003/0159990 | A1 * | 8/2003 | Collins et al. ............. | 210/615 |

FOREIGN PATENT DOCUMENTS

| | | |
|---|---|---|
| EP | 516357 | 12/1992 |
| EP | 888810 | 1/1999 |
| GB | 2200104 A | 7/1988 |
| GB | 2251254 A | 7/1992 |
| JP | 63091196 A | 4/1988 |
| JP | 3004996 A | 1/1991 |
| JP | 4004098 A | 8/1992 |
| JP | 5345195 A | 12/1993 |
| JP | 7232192 A | 9/1995 |

OTHER PUBLICATIONS

Bergman, R.A., et al., "Gwinnett County Water Reclamation with 50 mgd Ultra filtration—Proof Testing and Design", American Water Works Association.

"Design Considerations for Small Drinking Water Membrane Systems", Pall Corporation, www.pall.com/water_8155. asp, pp. 1-5.

"Indirect Potable Water Reuse, San Diego Water Purification Project", www.cmhc-schl.gc.ca/en/imquaf/himu/wacon/wacon_016.cfm, pp. 1-3.

"HYDRACoRe Chlorine Tolerant Spiral Wound Nanofiltration Color Removal Membrane Elements", Tech. Appl. Bulletin No. 109, Revision B, Hydranautics a Nitto Denko Corp., www.membranes.com, pp. 1-10, Feb. 22, 2002.

Calvo, C. et al. (2001), "Death Taxes . . . and RO Membrane Fouling", GE Water Technologies, Water Technology 69, www.gewater.com/library/tp/701_Death_Taxes.jsp, pp. 1-6, Nov. 1995.

Gould, C.K., et al., "A Practical Approach to Controlling the Fouling of Ultra filtration Membranes: A Case Study of the Successful Development of a Commercial Soy Protein Application", www.environmental-centercom/articles/article384/article384.htm, pp. 1-14, Apr. 1992.

"Chemical Compatibility Desal Membrane Products—Membrane Types and Product Designations".

Layson, A., "Micro filtration—Current Know-how and Future Directions", IMSTEC, Sydney, Australia, 2003.

Roquebert, V., et al., "Identifying and Resolving Key Design Considerations for Integration of Low Pressure Membrane Filtration and Lime Softening Process", AWWA Membrane Technology Conference, Atlanta, Georgia, 2003.

Calvo, C. , et al. (2001) "Behaviour of a nitrifying and denitrifying submerged filters in the treatment of urban wastewater," Current Studies of Biotechnology 2, 175-181.

Kang, I., et al. (2003) Characteristics of micro filtration membranes in a membrane coupled sequencing batch reactor system, Water Research 37, 1192-1197.

Lee, J.-M , et al. (2001) Comparison of the Filtration Characteristics between suspended and Attached Growth Microorganisms in Submerged Membrane Bioreactor, Water Research . 35(10), 2435-2445.

Nagaoka, H. et al. (1996) Influence of Bacterial extra cellular polymers on the membrane separation activated sludge process, Water Science and Technology, 34(9) 165-72.

Nagaoka, H. et al. (1998) Modeling of biofouling by extra cellular polymers in a membrane separation activated sludge system, Water Science and Tech., 38(4-5), 497-504.

Laîné, J.M. et al., Understanding Membrane Fouling: A Review of Over a Decade of Research, Ondeo Services—CIRSEE.Email: jean-michel.laine@ondeo.com, pp. 351-361.

"Chemical Pretreatment for RO and NF", Technical Application Bulletin No. 111, Revision A, Hydranautics A Nitto Denko Corporation, www.membranes.com, pp. 1-15, Mar. 22, 2002.

Ognier, S., et al. (2002) Characterization and modeling of fouling in membrane bioreactors, Desalination 146 (1-3) 141-147.

Suty, S., et al. (1996) Stability of ground and precipitated calcium carbonate suspension in the presence of polyethylenimine and salt, J. Pulp Paper Science 22 (9), J321-J326.

Vanerek, A., et al. (2000) Colloidal behaviour of ground and precipitated calcium carbonate fillers: effect of cationic polyelectrolytes and water quality, J. Pulp Paper Science 26 (4), 135-139.

Zahid, A. (1997) Gypsum scale formation on heat exchanger surgaces: the influence of poly (acrylic acid), poly (aspartic acid), and poly (glutamic acid), Acta Polytechnica Scandinavica, Chemical technology series 244, 56-58.

Water Treatment Membrane Process, McGraw-Hill, 1996, p. 17.2.

\* cited by examiner

Anaerobic MBR equipped with submerged membranes

Anaerobic MBR equipped with side stream (or cross flow) membranes

METHOD FOR IMPROVING FLUX IN A MEMBRANE BIOREACTOR

TECHNICAL FIELD

This invention concerns the use of water soluble cationic, amphoteric or zwitterionic polymers, or a combination thereof to increase water flux through membranes in membrane bioreactors.

BACKGROUND OF THE INVENTION

The membrane bioreactor (MBR) unit combines two basic processes: biological degradation and membrane separation-into a single process where suspended solids and microorganisms responsible for biodegradation are separated from the treated water by a membrane filtration unit. The entire biomass is confined within the system, providing for both control of the residence time for the microorganisms in the reactor (mixed liquor age) and the disinfection of the effluent.

In general, influent enters the bioreactor, where it is brought into contact with the biomass.

The mixture is filtered through the membrane using a pump, water pressure or a combination of both. The permeate is discharged from the system while the entire biomass is maintained in the bioreactor The permeate is discharged from the system while the entire biomass is returned to the bioreactor. Excess mixed liquor is pumped out in order to maintain a constant mixed liquor age, and the membrane is regularly cleaned by backwashing, chemical washing, or both.

Membranes used in the MBR unit include ultra- and microfiltration, inner and outer skin, hollow fiber, tubular, and flat, organic, metallic, ceramic, and the like. Preferred membranes for commercial application include hollow fiber with an outer skin ultrafilter, flat sheet ultrafilter and hollow fiber with an outer skin microfilter. Preferred membrane pore size is 0.01-5 micron.

In the aerobic membrane bioreactor (MBR) process, membrane fouling has always been a significant issue limiting the hydraulic performance of the process. Due to membrane fouling, MBR throughput or flux often decreases and more membranes are required to compensate for the throughput loss.

Recently, many research results (Nagaoka et al, 1996, 1998; Lee et al., 2002) have shown that one of the main causes of membrane fouling is biopolymers, which includes polysaccharides and proteins secreted by the biomass present in the mixed liquor of the MBR. In addition, a number of inorganic scales formed in bioreactors have been reported, where the salt concentrations in the influent were relatively high. As a result of scale formation on the membrane surface, the membrane performance was significantly reduced (Huisman, 2005; Ognier, 2004).

To prevent membrane fouling caused by biopolymers, methods were developed using cationic polymers that do not react with negatively charged membranes in contact with the mixed liquor (Collins and Salmen, 2004). In this method, various polymers are added directly to the aerobic MBR usually to the aeration tank and these polymers react with the biopolymers. The resulting particles, which consist of biopolymers and polymers, have considerably lower membrane fouling tendencies.

The same microbiologically produced polysaccharide and protein biopolymers produced in MBRs that cause membrane fouling are also known to cause foaming in the MBR mixed liquor. This is because these compounds contains many surface active functional groups that help stabilize foam at the air-water interface. In addition, MBRs often contain significant amounts of filamentous microorganisms that have been correlated to foam formation. Both the biopolymers and filamentous microorganisms react with the cationic polymers described in this invention. Previous work has shown foam reduction or foam elimination always occurs at the same time that cationic polymer has been observed to improve membrane flux. (Richard, 2003).

In the mean time, anoxic and anaerobic tanks are increasingly being installed in MBRs to increase nitrogen and phosphorus removal efficiencies. In these conditions, the aerobic biomass will be periodically exposed to oxygen scarce conditions while the anaerobic biomass will be exposed to aerobic conditions, since the mixed liquors are recycled between oxygen rich and oxygen scarce conditions. Therefore biomass will produce more biopolymer due to oxygen stress. Apart from the accelerated biopolymer generation triggered by the cyclic oxygen concentrations, biopolymer generation also can be accelerated by low dissolved oxygen (DO) conditions in anoxic and anaerobic tanks (Calvo et al., 2001).

The most direct evidence of the accelerated membrane fouling at low DO situations was obtained in Kang et al.'s experiment (2003). In their experiment, nitrogen gas was used to continuously scour the submerged membranes, while air was supplied through separate nozzles to the area above which no membrane was placed. The permeate flow was constantly maintained at 20 L/m²/hr. As soon as air supply was stopped, TMP started to increase and DO started to decrease.

Accordingly, if anoxic and/or anaerobic tanks are installed in a MBR process, the biopolymer content in the mixed liquor will be higher than that in other MBRs having only aeration tanks. Therefore, if the MBR contains anoxic and anaerobic reactors, the previous method (John et al, 2004) will be considerably less effective in terms of dosage and flux improvement. In addition, the previous method would not be effective in anaerobic MBRs, which includes anaerobic digester as a sole bioreactor or one of the bioreactors. A more effective and economic method, which allows better performance and lower dosage, is necessary.

Apart from the biopolymer problem, recently, inorganic fouling has been reported in a number of MBRs (Huisman, 2005; Ognier et al, 2002). This inorganic fouling often consists mainly of calcium carbonate ($CaCO_3$) and/or calcium phosphate, which may precipitate in the aerated biological wastewater treatment or directly onto the membrane ("scaling"). The inorganic fouling also includes iron oxides.

Aeration in the treatment tank (and in the membrane tank) can lead to inorganic fouling by various routes. For example, aeration drives the dissolved $CO_2$ out of the wastewater and this pushes the equilibrium of reaction (1) to the right.

$$HCO_3^- \Leftrightarrow CO_3^{2-} + CO_2 (g) \tag{1}$$

The carbonate ($CO_3^{2-}$) formed by reaction (1) precipitates with calcium that is present in the wastewater to form $CaCO_3$ (limestone). Moreover, reaction (1) will cause an increase in pH, which will favor calcium phosphate and iron oxide precipitation. The precipitation of carbonates and phosphates will partly take place in the bulk wastewater and this will form small particles, of which most will be retained by the membranes. This precipitation will also take place on all surfaces, among which is the membrane surface.

SUMMARY OF THE INVENTION

The present invention provides for a method of improving flux in a membrane bioreactor of which the influent has a concentration of salts of inorganic oxides sufficient to cause scaling or inorganic fouling conditions by adding an effective amount of one or more cationic, amphoteric or zwitterionic polymers, or a combination thereof to said membrane bioreactor. The membrane bioreactor may also comprise one or more aerobic reactors. The membrane reactor may also comprise a combination of at least two of the following reactors: anaerobic, anoxic, and aerobic reactors.

The present invention also provides for a method of improving flux in a membrane bioreactor that is made of at least two of the following types of reactors: anaerobic, anoxic, and aerobic reactors. An effective amount of one or more cationic, amphoteric, or zwitterionic polymers or combination thereof is added to this type of membrane bioreactor.

The present invention also provides for a method of improving flux in a membrane bioreactor which comprises one or more anaerobic digesters. An effective amount of one or more cationic, amphoteric, or zwitterionic polymers or combination thereof is added to this type of membrane bioreactor.

The present invention also provides for a method of improving flux in a membrane bioreactor which comprises one or more anaerobic digesters, and one or more aerobic reactors. An effective amount of one or more cationic, amphoteric, or zwitterionic polymers or combination thereof is added to this type of membrane bioreactor.

DETAILED DESCRIPTION OF THE INVENTION

Definitions of Terms

Figure 1:
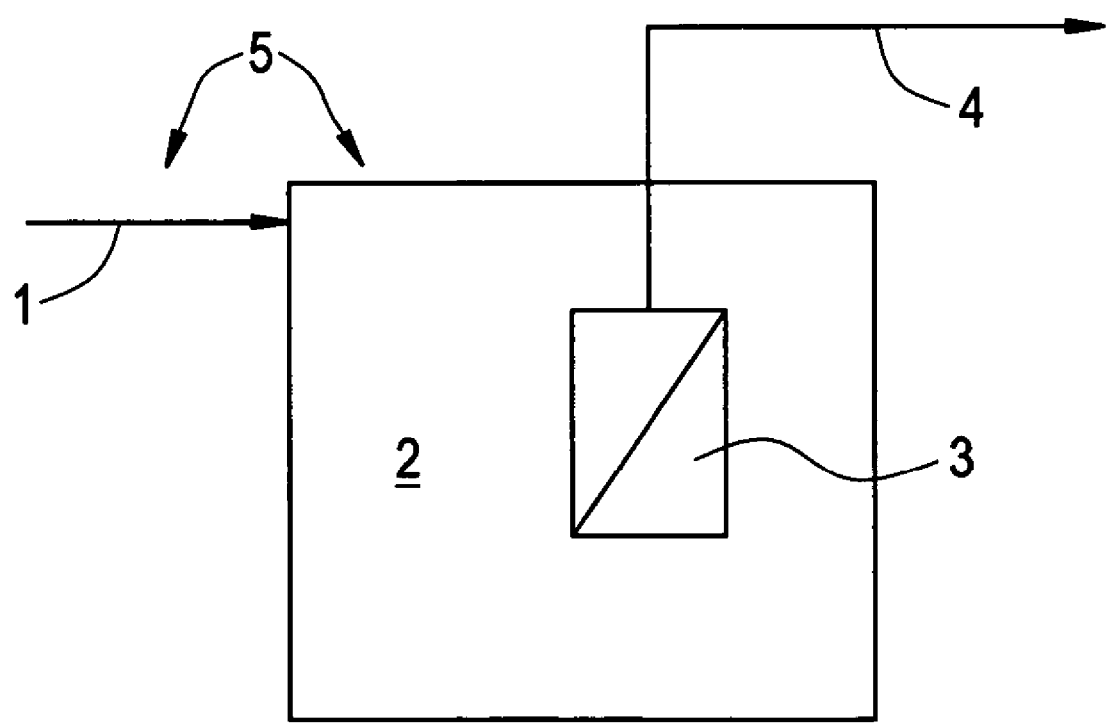
FIG. 1 is a schematic of a typical example of MBR, which consists of an aeration tank alone, and where 1 correlates to wastewater (COD=50-30,000 mg/L), 2 correlates to an aeration tank, 3 correlates to membranes, 4 correlates to effluent obtained by pumps or gravity, and 5 correlates to polymer addition.

"About" means nearly or equal to.

As used herein, the following abbreviations and terms have the following meanings: MBR for Membrane Bioreactor; AcAM for acrylamide; and DMAEA.MCQ for dimethylaminoethylacrylate methyl chloride quaternary salt.

"Amphoteric polymer" means a polymer derived from both cationic monomers and anionic monomers, and, possibly, other non-ionic monomer(s). Amphoteric polymers can have a net positive or negative charge. The amphoteric polymer may also be derived from zwitterionic monomers and cationic or anionic monomers and possibly nonionic monomers. The amphoteric polymer is water soluble.

"Cationic polymer" means a polymer having an overall positive charge. The cationic polymers of this invention are prepared by polymerizing one or more cationic monomers, by copolymerizing one or more nonionic monomers and one or more cationic monomers, by condensing epichlorohydrin and a diamine or polyamineor condensing ethylenedichloride and ammonia or formaldehyde and an amine salt. The cationic polymer is water soluble.

"Cationic monomer" means a monomer which possesses a net positive charge.

"Solution polymer" means a water soluble polymer in a water continuous solution.

"Aerobic tank" means a bioreactor having higher than 0.5 ppm of dissolved oxygen to grow aerobic bacteria. Under this condition bacteria can actively oxidize organic materials contained in influent using the dissolved oxygen.

"Anoxic tank" means a bioreactor having less than 0.5 ppm of dissolved oxygen. This reactor is typically fed with a mixed liquor having higher than 3 ppm of nitrate ($NO3^-$) ion as nitrogen. Under this condition, most of heterotrophic bacteria can breathe with the combined oxygen in the nitrate and reduce the nitrate to nitrogen gas that eventually discharges to the air.

"Anaerobic tank" means a bioreactor having less than 0.1 ppm of dissolved oxygen and less than 3 ppm of nitrate ion.

"Anaerobic digester" means a bioreactor that is completely isolated from the air with top cover to grow strict anaerobic bacteria which produces methane gas.

"Zwitterionic polymer" means a polymer composed from zwitterionic monomers and, possibly, other non-ionic monomer(s). In zwitterionic polymers, all the polymer chains and segments within those chains are rigorously electrically neutral. Therefore, zwitterionic polymers represent a subset of amphoteric polymers, necessarily maintaining charge neutrality across all polymer chains and segments because both anionic charge and cationic charge are introduced within the same zwitterionic monomer. The zwitterionic polymer is water soluble.

"Zwitterionic monomer" means a polymerizable molecule containing cationic and anionic (charged) functionality in equal proportions, so that the molecule is net neutral overall.

Preferred Embodiments

The cationic, amphoteric, and zwitterionic polymers or a combination thereof are introduced directly into one of the bioreactors or any liquid stream flowing to one of the bioreactors by various means.

In all cases, the polymer should be reasonably mixed with the mixed liquor in the bioreactor to maximize adsorption. This may be accomplished by feeding the polymer into an area of the bioreactor where an aeration nozzle is located. So-called "dead" zones in the bioreactor having little to no flow should be avoided. In some cases, a submerged propeller mixer may be needed to increase mixing in the basin, or the mixed liquor can be re-circulated through a side arm loop.

Solution polymers can be dosed using a chemical metering pump such as the LMI Model 121 from Milton Roy (Acton, Mass.).

In one embodiment, the membrane bioreactor influent has concentration of salts or inorganic oxides that is sufficient to cause scaling and organic fouling. The salts and inorganic oxides are selected from the group consisting of: magnesium, calcium, silicon and iron. In another embodiment, both magnesium and calcium salts or inorganic oxides may have a concentration of about 5 ppm or greater, iron salts or inorganic oxides have a concentration of about 0.1 ppm or greater, and silicon salts or inorganic oxides have a concentration of about 5 ppm or greater. In yet another embodiment, the salts are selected from the group consisting of: carbonates, phosphates, oxylates, and sulfates.

In another embodiment, the amount of cationic polymer that is added to a membrane bioreactor is about 10 to about 2,000 ppm as active based on the total membrane bioreactor volume.

In another embodiment, the cationic polymer that is added to a membrane bioreactor has a molecular weight of about 25,000 Da or more.

In another embodiment, the cationic polymer that is added to a membrane bioreactor has about 10% mole charge or more.

In another embodiment, the cationic polymer that is added to a membrane bioreactor is 25,000 Da or more and has about 10% mole charge or more.

In another embodiment, the cationic polymer added to a membrane bioreactor is selected from the group consisting of a polymer of epichlorhydrin-dimethylamine crosslinked with either ammonia or ethylenediamine; a linear polymer of epichlorohydrin and dimethylamine, a homopolymer of polyethyleneimine; polydiallydimethylammonium chloride; homopolymer of $DMAEM.H_2SO_4$; polymerized triethanolamine/methyl chloride quat, polymerized triethanolamine and tall oil fatty acid/methyl chloride quat, polyethylenedichloride/ammonia, and modified polyethyleneimine.

In another embodiment, the cationic polymer added to a membrane bioreactor is a polymer of (meth)acrylamide and one or more cationic monomers include dialkylaminoalkyl acrylates and methacrylates and their quaternary or acid salts, including, but not limited to, dimethylaminoethyl acrylate methyl chloride quaternary, salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride.

In another embodiment, the cationic polymer added to a membrane bioreactor is diallyldimethylammonium chloride/acryamide copolymer.

In another embodiment, the amphoteric polymer added to a membrane bioreactor is selected from the group consisting of: dimethylaminoethyl acrylate methyl chloride quaternary salt/acrylic acid copolymer, diallyldimethylammonium chloride/acrylic acid copolymer, dimethylaminoethyl acrylate methyl chloride salt/N,N-dimethyl-N-methacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAE-A.MCQ/Acrylic acid/N,N-dimethyl-N-methacrylamidopropyl-N-(3-sulfopropyl)-ammonium betaine terpolymer.

In another embodiment, the zwitterionic polymer added to a membrane bioreactor is about 99 mole percent and composed of N,N-dimethyl-N-methacrylamidopropyl-N-(3-sulfopropyl)-ammonium betaine and about 1 mole percent of more nonionic monomers.

The following examples are not meant to limit the invention.

EXAMPLE 1

Figure 2:
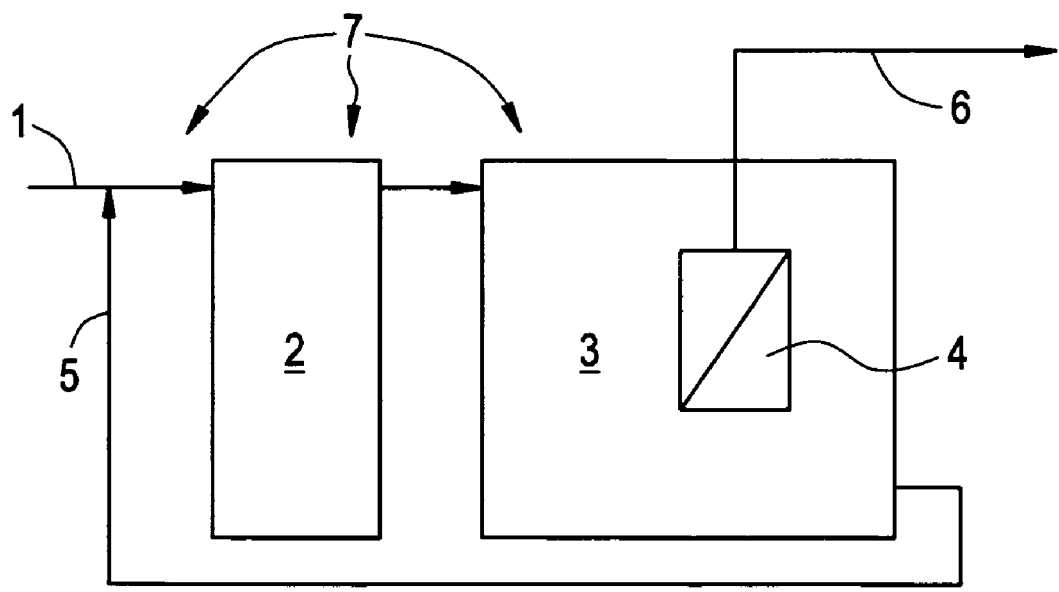
FIG. 2 is a schematic of typical example of MBR, which consists of aeration and anoxic tanks. Reactor sizes in the schematic do not represent the volume ratio of reactors and 1 correlates to wastewater (COD=50-30,000 mg/L), 2 correlates to an anoxic tank, 3 correlates to an aeration tank, 4 correlates to membranes, 5 correlates to internal sludge recycle from aeration tank to anoxic tank, 6 correlates to effluent obtained by pumps or gravity, and 7 correlates to polyelectrolyte addition.

In FIG. 2, membranes (3) are directly submerged in the aeration tank (2). The aeration tank can be divided by multiple numbers of reactors. Membranes can be submerged to one of the reactors or can be installed outside of the reactor. The MLSS of the mixed liquor can be maintained between 3,000 mg/L and 30,000 mg/L. When influent (1) has higher than 5 ppm of calcium ion and/or higher than 5 ppm of magnesium and/or higher than 10 ppm of silica and/or higher than 0.1 ppm iron, scale formation or inorganic fouling can occur on the membrane surface. Cationic polymers having a MW of 10,000-20,000,000 Da and charge of 1-100% can be added directly to the one of the tanks (5) or any of the streams flowing to one of the reactors at a concentration of 10-2,000 ppm as active polymer. The upper limit of MW is limited only by the solubility or dispersibility of the polymer in water.

EXAMPLE 2

In FIG. 2 anoxic tank (2) is added to the aeration tank (3) and mixed liquor in the aeration tank is recycled to the anoxic tank, where no air is supplied to maintain dissolved oxygen level at <0.5 mg/L. The nitrogen compounds contained in wastewater are oxidized to nitrate in the aeration tank (3) and recycled to anoxic tank (2). In the anoxic tank, some denitrifying bacteria utilize the combined oxygen contained in the nitrate ions and produce nitrogen gas. The membrane configuration can be flat sheet, hollow fiber, tubular, or combinations of these. Optionally membranes can be placed outside of membrane tank and the sludge in one of the tanks can be circulated to the membrane system by pump(s). When influent (1) has higher than 5 ppm of calcium ion and/or higher than 5 ppm of magnesium and/or higher than 0.1 ppm of iron and/or higher than 10 ppm of silica, scale formation or inorganic fouling can occur on the membrane surface.

Though a broad range of cationic polymers are helpful to prevent membrane fouling, high M.W. (>50,000 Da) and high mole charge (>10%) polymers will be particularly effective. One or multiple number of different polymers can be added to the anoxic tank and/or the aeration tank and/or any flow stream flowing to one of the reactors.

EXAMPLE 3

Figure 3:
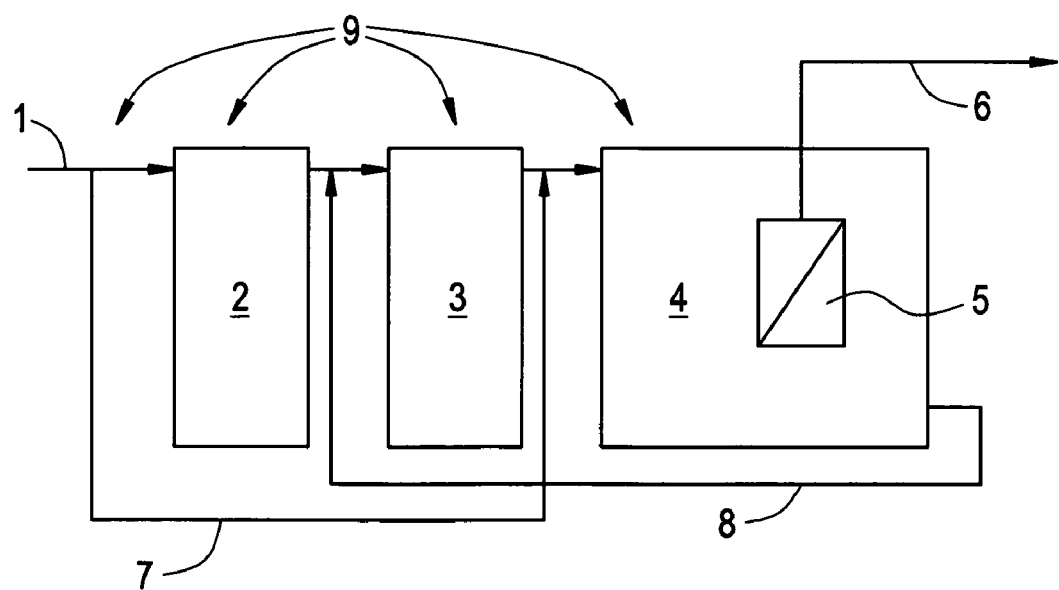
FIG. 3 is a schematic of a typical example of an MBR, which consists of aeration, anoxic, and anaerobic tanks. Reactor sizes in the schematic do not represent the volume ratio of reactors, and where 1 correlates to wastewater (COD=50-30,000 mg/L), 2 correlates to anaerobic tank (no aeration), 3 correlates to anoxic tank (no aeration), 4 correlates to aeration tank, 5 correlates to membranes, 6 correlates to effluent obtained by pumps or gravity, 7 correlates to internal sludge recycle from anoxic tank to anaerobic tank, 8 correlates to internal sludge recycle from aeration tank to anoxic tank, and 9 correlates to polyelectrolyte addition.

In FIG. 3, an anaerobic (2) and an anoxic (3) tank are added to the aeration tank (4) together for maximum phosphorous removal. Though the mixed liquor recycled from the anoxic tank to the anaerobic tank (7) contains some nitrate ions, the overall oxygen supply is extremely limited since DO level is less than 0.1 mg/L. Even in this environment, some phosphorous accumulation organisms (PAOs) can obtain energy by hydrolyzing the polymeric form of phosphorous that was accumulated in the cell. Once PAOs move to aeration tank through the anoxic tank, they overly accumulate phosphorous for the future use, which is the so called "Luxury Uptake". The overly accumulated phosphorous is eventually removed when excess biosolids are removed from the system. The membrane configuration can be flat sheet, hollow fiber, tubular, or a combination of these. Optionally the membranes can be placed outside of the tanks and the sludge can be circulated through the membranes to the tanks by pumps. When influent (1) has higher than 5 ppm of calcium ion and/or higher than 5 ppm of magnesium and/or higher than 0.1 ppm of iron and/or higher than 10 ppm silica, scale formation or inorganic fouling can occur on the membrane surface.

Though a broad range of cationic polymers are helpful to prevent membrane fouling, high M.W. (>50,000 Da) and high mole charge (>10%) polymers will be particularly effective. One or multiple number of different polymers can be added to the anoxic tank and/or the aeration tank and/or any flow stream flowing to one of the reactors.

EXAMPLE 4

Figure 4A:
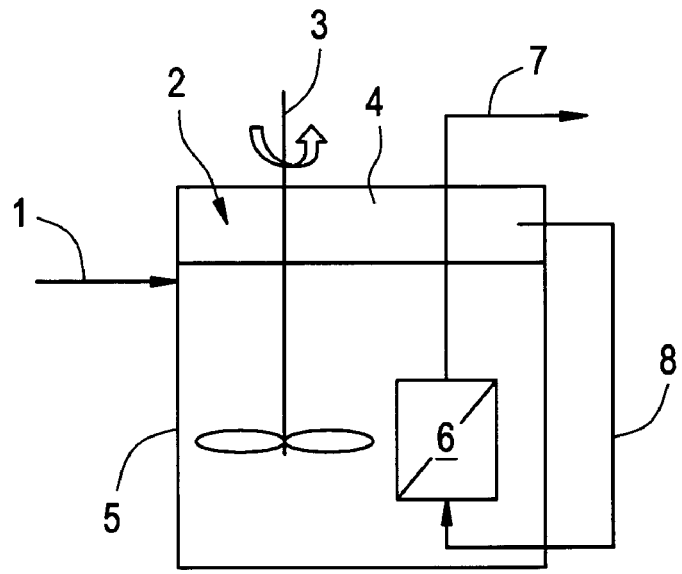
FIG. 4 is a schematic of an anaerobic MBR and where 1 correlates to wastewater (COD=200-100,000 mg/L), 2 correlates to polyelectrolyte addition (it can also be added any place in the streamline in membrane side), 3 correlates to a mixer (optional), 4 correlates to headspace, 5 correlates to anaerobic tank, 6 correlates to membranes, 7 correlates to effluent, 8 correlates to gas recycle from head space to the bottom of membranes, and 9 correlates to sludge recirculation pump.
Figure 4B:
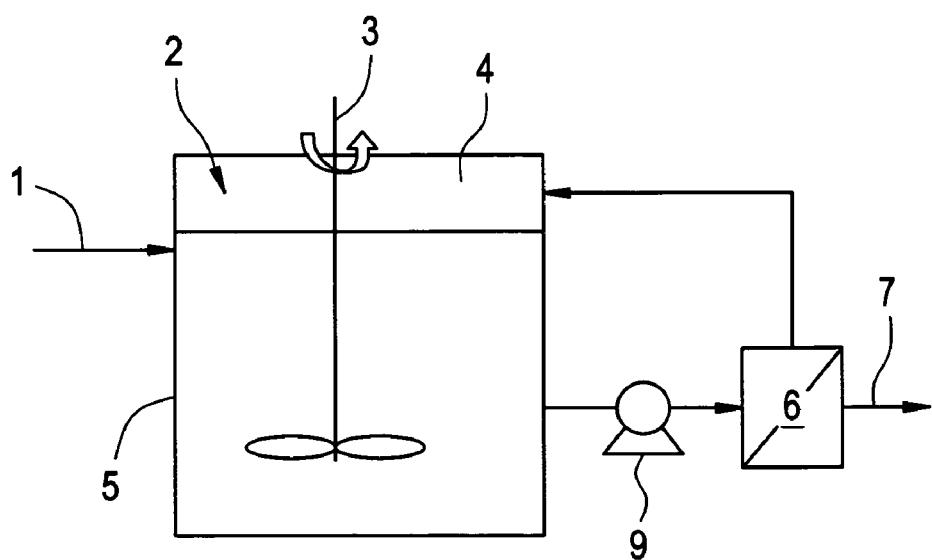

The fourth application example is an anaerobic MBR (FIG. 4), which operates between ambient temperatures and 70° C. This MBR has a cover on the top of the reactor and no air is supplied. Optionally mechanical agitation can be performed using the mixer (3). In the case of submerged membrane (FIG. 4a), gases in the headspace (4) can be recycled to the bottom of the tank to scour the membranes. If membranes are externally equipped (FIG. 4b), sludge circulation pumps (9) should be used. This anaerobic digester can be used solely or used with a combination of aerobic reactor. The mixed liquor suspended solids (MLSS) level is maintained at 3,000-30,000 mg/L and the influent COD is 200-100,000 mg/L.

What is claimed is:

1. A method for improving flux in a membrane bioreactor system, the membrane bioreactor system comprising at least one anoxic reactor and at least one aeration tank, the at least one aeration tank having at least one aeration nozzle, the membrane bioreactor system comprising a submerged membrane of which the influent has a concentration of salts or inorganic oxides sufficient to cause scaling or inorganic fouling conditions, the method comprising adding an effective amount of one or more cationic, amphoteric or zwitterionic polymers, or a combination thereof to said membrane bioreactor system, wherein said membrane bioreactor system has mixed liquor suspended solids of 3,000 to 30,000 mg/L;
wherein the cationic, amphoteric, or zwitterionic polymers are introduced directly into the membrane bioreactor system, including being added directly to the at least one anoxic reactor.

2. The method of claim 1 wherein said salts or inorganic oxides are selected from the group consisting of: magnesium, calcium, silicon and iron.

3. The method of claim 2 wherein said magnesium or said calcium has a concentration of about 5 ppm or greater, or said iron has a concentration of about 0.1 ppm or greater, or said silicon has a concentration of about 5 ppm or greater.

4. The method of claim 1 wherein said effective amount of cationic polymer is about 10 to about 2,000 ppm as active based on the total membrane bioreactor volume.

5. The method of claim 1 wherein said membrane bioreactor system further comprises at least one of the following types of reactors: anaerobic reactors and aerobic reactors.

6. The method of claim 1 wherein said membrane bioreactor system comprises at least one aerobic reactor.

7. The method of claim 1 wherein said salts are selected from the group consisting Of: carbonates, phosphates, oxylates, and sulfates.

8. A method for improving flux in a membrane bioreactor, the membrane bioreactor containing a submerged membrane, the method comprising the steps of:
   a. providing said membrane bioreactor, the membrane bioreactor comprising a combination of at least two of the following types of reactors: anaerobic reactors, anoxic reactors, and aerobic reactors; and
   b. adding an effective amount of one or more cationic, amphoteric or zwitterionic polymers, or a combination thereof to said membrane bioreactor, wherein said membrane bioreactor has mixed liquor suspended solids of 3,000 to 30,000 mg/L, and wherein the polymers are added to at least two of the following types of reactors: anaerobic reactors, anoxic reactors, and aerobic reactors, the polymers added directly through a feed stream.

9. The method of claim 8 wherein said effective amount of cationic polymer is about 10 to about 2,000 ppm as active based on the total membrane bioreactor volume.

10. The method of claim 8 wherein said cationic polymer that is added to said membrane bioreactor has a molecular weight of about 25,000 Da or more.

11. The method of claim 8 wherein said cationic polymer that is added to said membrane bioreactor has about 10% mole charge or more.

12. The method of claim 8 wherein said cationic polymer that is added to said membrane bioreactor is about 25,000 Da or more and has about 10% mole charge or more.

13. The method of claim 8 wherein said cationic polymer is selected from the group consisting of a polymer of epichlorhydrin-dimethylamine crosslinked with either ammonia or ethylenediamine; a linear polymer of epichlorohydrin and dimethylamine, a homopolymer of polyethyleneimine; polydiallydimethylammonium chloride; homopolymer of $DMAEM \cdot H_2SO_4$, polymerized triethanolamine/methyl chloride quat, polymerized triethanolamine and tall oil fatty acid/methyl chloride quat, polyethylenedichloride/ammonia, and modified polyethyleneimine.

14. The method of claim 8 wherein said cationic polymer is a polymer of (meth)acrylamide and one or more cationic monomers selected from the group consisting of: dialkylaminoalkyl acrylates and their quaternary or acid salts, dialkylaminoalkyl methacrylates and their quaternary or acid salts, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts, acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, and diallyldimethyl ammonium chloride.

15. The method of claim 8 wherein said cationic polymer is diallyldimethylammonium chloride/acrylamide copolymer.

16. The method of claim 8 wherein said amphoteric polymer is selected from the group consisting of dimethylaminoethyl acrylate methyl chloride quaternary salt/acrylic acid copolymer, diallyldimethylammonium chloride/acrylic acid copolymer, dimethylaminoethyl acrylate methyl chloride salt/N,N-dimethyl-Nmethacrylamidopropyl-N-(3-sulfopropyl)-ammonium betaine copolymer, acrylic acid/N,N-dimethyl-N-methacrylamidopropyl-N-(3-sulfopropyl)-ammonium betaine copolymer and DMAEA·MCQ/Acrylic acid/N,N-dimethyl-N-methacrylamidopropyl-N-(3-sulfopropyl)-ammonium betaine terpolymer.

17. The method of claim 8 wherein said zwitterionic polymer is composed of about 99 mole percent of N,N-dimethyl-N-methacrylamidopropyl-N-(3-sulfopropyl)-ammonium betaine and about 1 mole percent of more nonionic monomers.

18. A method for improving flux in a membrane bioreactor, the membrane bioreactor containing a submerged membrane, the method comprising the steps of:
   a. providing said membrane bioreactor which comprises at least one anaerobic digester; and
   b. adding an effective amount of one or more cationic, amphoteric or zwitterionic polymers, or a combination thereof to said membrane bioreactor, wherein said membrane bioreactor has mixed liquor suspended solids of 3,000 to 30,000 mg/L, and wherein the polymers are added to the at least one anaerobic digester, directly through a feed stream.

19. A method for improving flux in a membrane bioreactor, the membrane bioreactor containing a submerged membrane, the method comprising the steps of:
   a. providing said membrane bioreactor which comprises a combination of at least one anaerobic digester and at least one aerobic reactor; and
   b. adding an effective amount of one or more cationic, amphoteric or zwitterionic polymers, or a combination thereof to said membrane bioreactor, wherein said membrane bioreactor has mixed liquor suspended solids of 3,000 to 30,000 mg/L, and wherein the polymers are added to the at least one anaerobic digester, directly through a feed stream.

20. A method for improving flux in a membrane bioreactor which comprises at least one of an anaerobic digester and an anoxic reactor, the membrane bioreactor containing a submerged membrane, the method comprising the steps of:
   providing the membrane bioreactor; and
   adding an effective amount of a chemical to the membrane bioreactor, the chemical comprised of at least one cationic polymer, wherein said membrane bioreactor has mixed liquor suspended solids of 3,000 to 30,000 mg/L, and wherein the chemical is added to the membrane bioreactor, including being added directly to at least one of the anaerobic digester and the anoxic reactor, the chemical added directly or indirectly through a feed stream;
   wherein the at least one cationic polymer has a molecular weight of at least about 25,000 Da;
   and wherein the at least one cationic polymer is added directly to the membrane bioreactor.

21. The method of claim 20, wherein the chemical has at least a 10 mole percent charge of the at least one cationic polymer.

22. The method of claim 21, wherein the membrane bioreactor comprises a combination of at least two of the following types of reactors: an anaerobic reactor, an anoxic reactor, and an aerobic reactor.

23. The method of claim 21, wherein the membrane bioreactor comprises at least one anaerobic digester, and wherein the chemical is added to the at least one anaerobic digester, directly or indirectly through a feed stream, wherein the anaerobic digester is operated at a temperature range of about ambient temperature to about 70° C.

* * * * *